United States Patent
Rawls

(10) Patent No.: US 10,349,634 B2
(45) Date of Patent: Jul. 16, 2019

(54) SQUIRREL DETERRENT KIT

(71) Applicant: Janice Rawls, Lilburn, GA (US)

(72) Inventor: Janice Rawls, Lilburn, GA (US)

(*) Notice: Subject to any disclaimer, the term of this patent is extended or adjusted under 35 U.S.C. 154(b) by 257 days.

(21) Appl. No.: 15/582,947

(22) Filed: May 1, 2017

(65) Prior Publication Data

US 2017/0318791 A1    Nov. 9, 2017

Related U.S. Application Data

(60) Provisional application No. 62/331,067, filed on May 3, 2016.

(51) Int. Cl.
  *A01K 39/01*      (2006.01)

(52) U.S. Cl.
  CPC ................. *A01K 39/0113* (2013.01)

(58) Field of Classification Search
  CPC ................. A01K 39/0113; A01M 29/30
  USPC ................................ 119/57.9, 52.3
  See application file for complete search history.

(56) References Cited

U.S. PATENT DOCUMENTS

| | | | |
|---|---|---|---|
| 4,031,856 A | | 6/1977 | Chester |
| 4,523,546 A | * | 6/1985 | Latham ............... A01K 39/0113 119/57.9 |
| 5,285,748 A | * | 2/1994 | Weldin ............... A01K 39/0113 119/57.9 |
| 5,355,835 A | * | 10/1994 | Freed ............... A01K 39/0113 119/52.3 |
| 5,690,056 A | * | 11/1997 | Korb ............... A01K 39/0113 119/52.3 |
| 5,720,238 A | * | 2/1998 | Drakos ............... A01K 39/0113 119/57.9 |
| 5,878,537 A | | 3/1999 | Flischel |
| 6,269,771 B1 | * | 8/2001 | Cotter ............... A01K 39/0113 119/57.9 |
| 6,532,894 B2 | | 3/2003 | Johnson |
| 6,640,746 B1 | | 11/2003 | Lund |
| 7,409,922 B1 | * | 8/2008 | Baynard ............... A01K 39/012 119/52.3 |
| 8,104,430 B1 | * | 1/2012 | Powell, Jr. ........ A01K 39/0113 119/52.3 |
| 2006/0102083 A1 | | 5/2006 | Ellen et al. |
| 2011/0259272 A1 | * | 10/2011 | Traska ............... A01K 39/0113 119/57.9 |

(Continued)

*Primary Examiner* — Trinh T Nguyen
(74) *Attorney, Agent, or Firm* — Asgaard Patent Services, LLC; F. Wayne Thompson, Jr.

(57) ABSTRACT

Implementations of a squirrel deterrent kit are provided. The squirrel deterrent kit may be used to prevent animals from climbing a pole to gain access to the bird feeder mounted thereon. In some implementations, the squirrel deterrent kit may comprise a sleeve member, a self-retracting reel, and a pole mounted fastener (e.g., a hook). In some implementations, the self-retracting reel may be positioned and/or secured within a cavity of the sleeve member. In some implementations, the pole mounted fastener may be configured to attach to an adapter (e.g., a ring) secured on the distal end of the line of the self-retracting reel. In this way, the self-retracting reel may be used to slidably connect the sleeve member to the pole. In some implementations, the sleeve member may comprise an elongated cylindrical stem having a dome shaped head. In some implementations, the sleeve member may include a longitudinally extending vertical slit therein.

10 Claims, 5 Drawing Sheets

(56) References Cited

U.S. PATENT DOCUMENTS

| | | | |
|---|---|---|---|
| 2013/0174789 A1* | 7/2013 | Koski | A01K 39/0113 119/57.9 |
| 2015/0173329 A1* | 6/2015 | Barr | A01K 39/0113 119/52.3 |
| 2015/0250148 A1* | 9/2015 | Rubin | A01K 39/0113 119/712 |

* cited by examiner

US 10,349,634 B2

SQUIRREL DETERRENT KIT

CROSS REFERENCE TO RELATED APPLICATION

This application claims the benefit of U.S. Patent Application Ser. No. 62/331,067, which was filed on May 3, 2016, and is incorporated herein by reference in its entirety.

TECHNICAL FIELD

This disclosure relates to implementations of a squirrel deterrent kit configured for use with pole mounted bird feeders.

BACKGROUND

Many people enjoy the presence of birds and place bird feeders on their property in order to attract them. Unfortunately, bird feeders are frequently raided by squirrels and other animals which climb up the post supporting the bird feeder and steal the food. As a result, the birds for which the food was intended are denied access thereto. There are numerous prior art attempts to solve this problem. However, such attempts have not always been successful and the squirrels, or other animals, frequently manage to circumvent these devices and climb up to the bird feeder and steal the food therein.

Accordingly, it can be seen that a need exist for a squirrel deterrent kit configured for use with pole mounted bird feeders. It is to the provision of a squirrel deterrent kit that may be used to prevent animals (e.g., cats, squirrels, and/or other rodents) from climbing the pole to gain access to the bird feeder mounted thereon, that the present invention is primarily directed.

SUMMARY OF THE INVENTION

Implementations of a squirrel deterrent kit are provided. In some implementations, the squirrel deterrent kit may be used to prevent animals (e.g., cats, squirrels, and/or other rodents) from climbing a pole to gain access to the bird feeder mounted thereon.

In some implementations, the squirrel deterrent kit may comprise a sleeve member, a self-retracting reel, and a pole mounted fastener (e.g., a hook). In some implementations, the self-retracting reel may be positioned and/or secured within a cavity in the sleeve member. In some implementations, the pole mounted fastener may be configured to attach to an adapter (e.g., a ring) secured on the distal end of the line of the self-retracting reel. In this way, the self-retracting reel may be used to slidably connect the sleeve member to the pole.

In some implementations, the sleeve member may comprise an elongated cylindrical stem and a dome shaped head. In this way, a squirrel, or other animal, may be prevented from climbing up the sleeve member prior to being dislodged by its descent. In some implementations, the cavity may be located within the head portion of the sleeve member. In some implementations, the sleeve member may further comprise an opening that extends through the longitudinal axis thereof. In some implementations, the diameter of the opening may be large enough to allow the sleeve member to slide freely up and down a length of the pole.

In some implementations, the sleeve member may include a longitudinally extending vertical slit therein. In some implementations, the vertical slit may extend from the interior opening through an exterior side of the sleeve member. In some implementations, the sleeve member may be flexible thereby allowing the vertical slit to be parted and the sleeve member fitted about a pole.

In some implementations, the line of the self-retracting reel may extend from the cavity, through a conduit in the head portion of the sleeve member, with the distal end thereof secured to the adapter (e.g., a ring). In some implementations, the adapter may include a collar thereon. In this way, the adapter may prevent the line from being drawn into the cavity of the sleeve member by the self-retracting reel.

In some implementations, the self-retracting reel may be used to lift the sleeve member to its equilibrium position on the pole and/or hold the sleeve member at its equilibrium position on the pole. In some implementations, the adapter may be configured to secure the sleeve member to the fastener mounted on the pole.

In some implementations, the line of the self-retracting reel may be short enough to arrest the fall of the sleeve member before it hits the ground adjacent the pole onto which the squirrel deterrent kit has been installed.

In some implementations, the fastener (e.g., a hook) may be mounted on the pole using a clamp.

DETAILED DESCRIPTION

Figure 1:
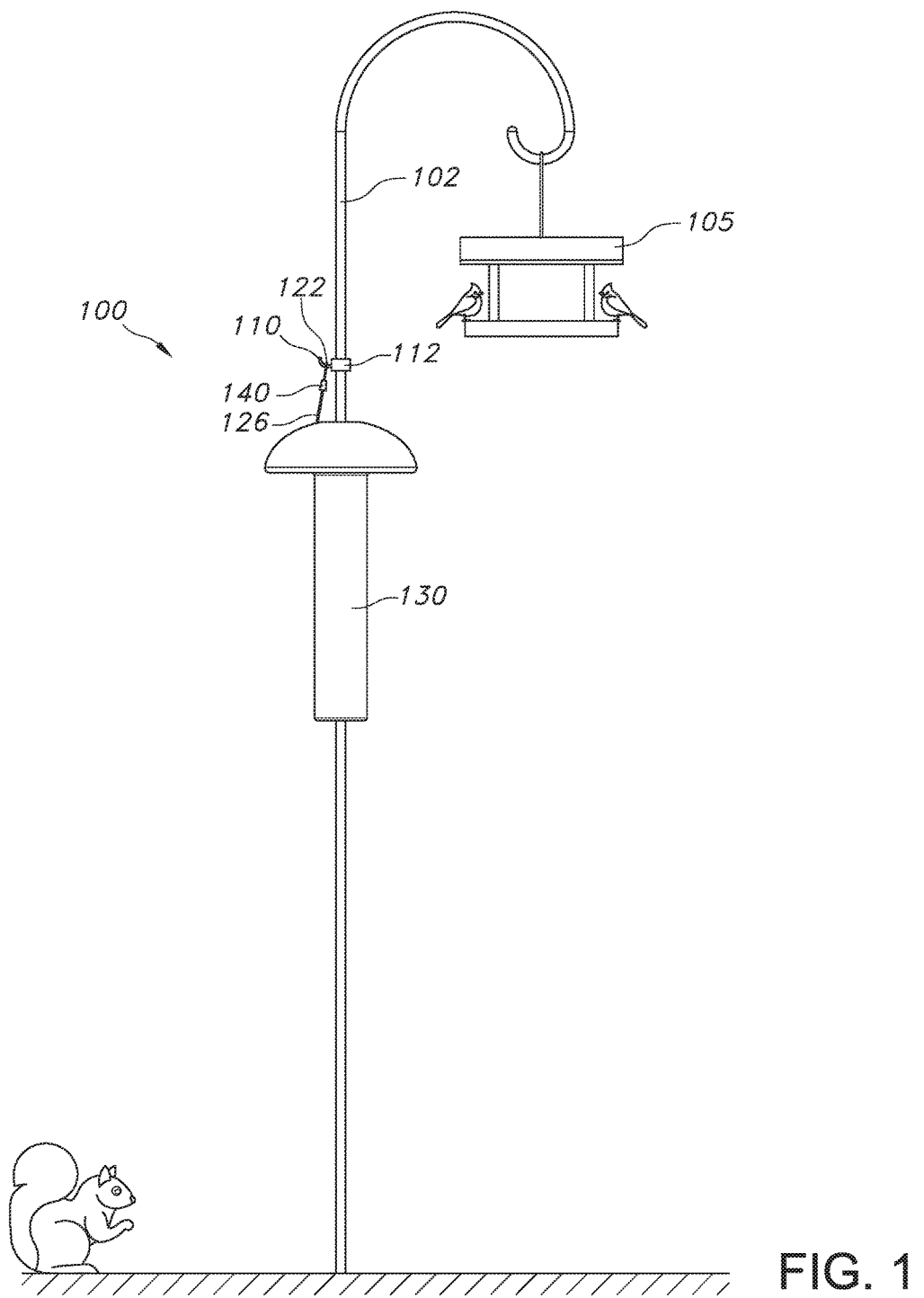
FIG. 1 illustrates a side view of a squirrel deterrent kit according to the principles of the present disclosure, wherein the squirrel deterrent kit has been installed on a pole having a feeder secured thereon.
Figure 2:
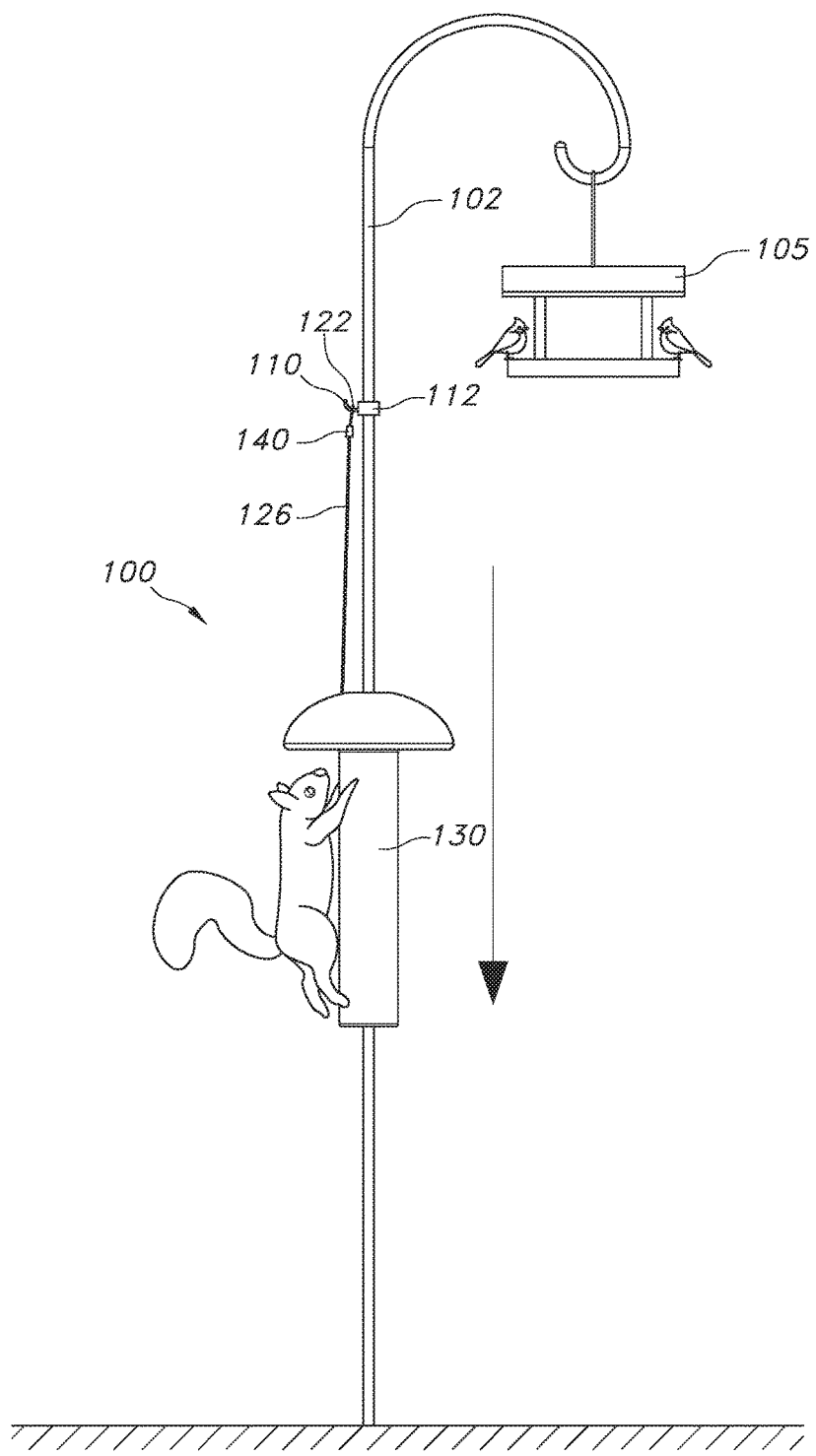
FIG. 2 illustrates a side view of the squirrel deterrent kit shown in FIG. 1, wherein the sleeve member has been lowered by the weight of a squirrel.

FIGS. 1 and 2 illustrate an example implementation of a squirrel deterrent kit 100 according to the principles of the present disclosure. In some implementations, the squirrel deterrent kit 100 may be used to prevent animals (e.g., cats, squirrels, and/or other rodents) from climbing a pole 102 to gain access to the bird feeder 105 mounted thereon.

As shown in FIGS. 1-4, in some implementations, the squirrel deterrent kit 100 may comprise a sleeve member 130, a self-retracting reel 120, and a pole mounted fastener 110 (e.g., a hook). In some implementations, the pole mounted fastener 110 may be configured to attach to an adapter 122 (e.g., a ring) secured on the distal end of the line 126 of the self-retracting reel 120. In this way, the self-retracting reel 120 may be used to slidably connect the sleeve member 120 to the pole 102 (see, e.g., FIGS. 1 and 2).

Figure 3:
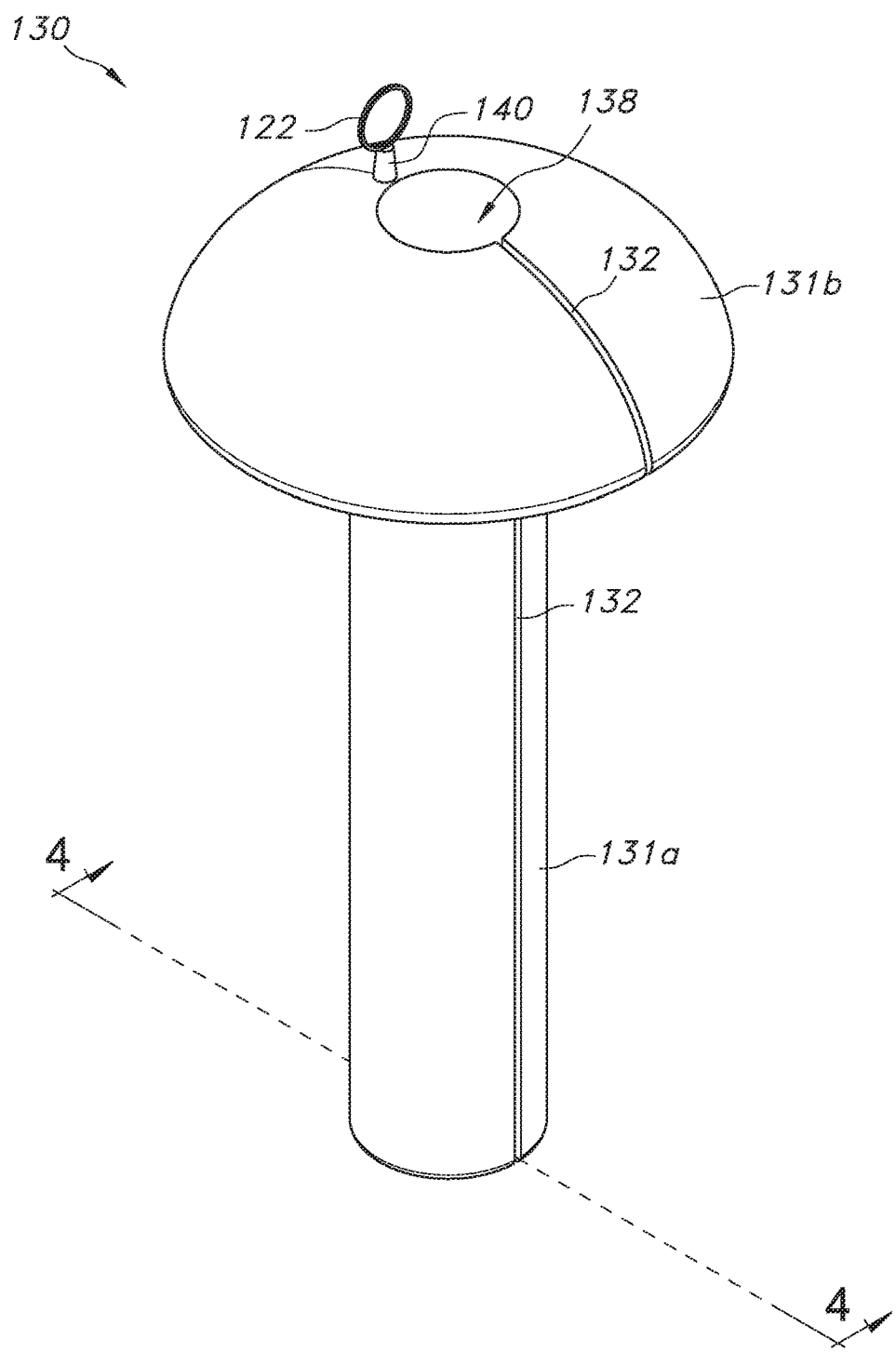
FIG. 3 illustrates an isometric view of the sleeve member according to the principles of the present disclosure.

As shown in FIG. 3, in some implementations, the sleeve member 130 may comprise an elongated cylindrical stem 131a and a dome shaped head 131b. In some implementations, the head portion 131 of the sleeve member 130 may have a larger diameter than the cylindrical stem 131a thereof (see, e.g., FIGS. 3, 4, and 5). In this way, a squirrel, or other animal, may be prevented from climbing up the sleeve member 130 prior to being dislodged by its descent. In some implementations, the sleeve member 130 may be an elongated cylinder, and/or other shape suitable for use as part of a squirrel deterrent kit 100.

Figure 4:
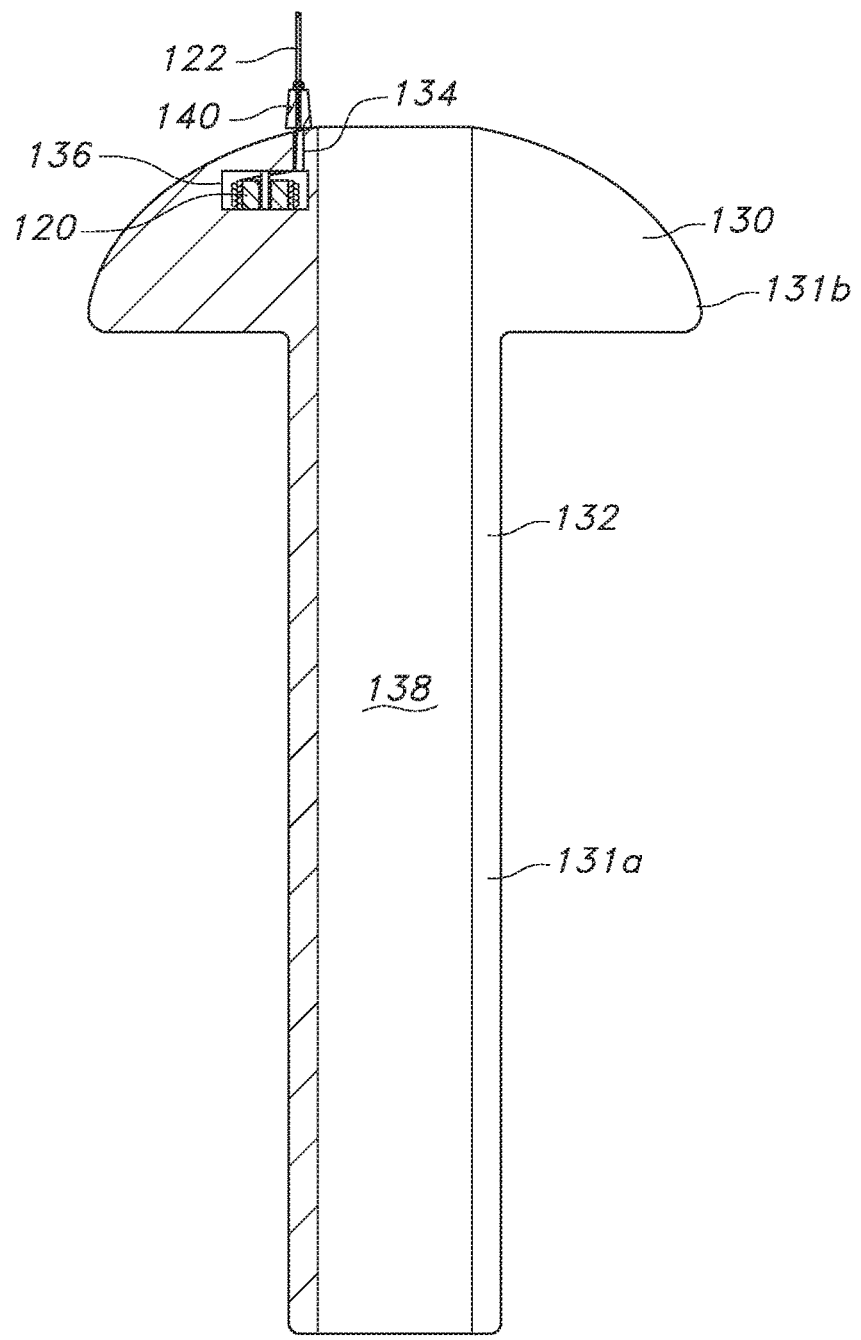
FIG. 4 illustrated a cross-sectional view of the sleeve member taken along line 4-4 of FIG. 3.
Figure 5:
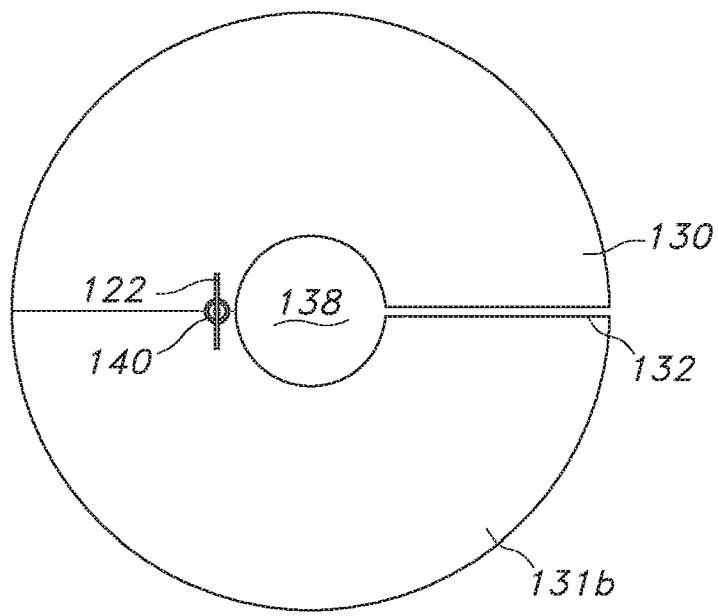
FIG. 5 illustrates a top view of the sleeve member shown in FIG. 3.
Figure 6:
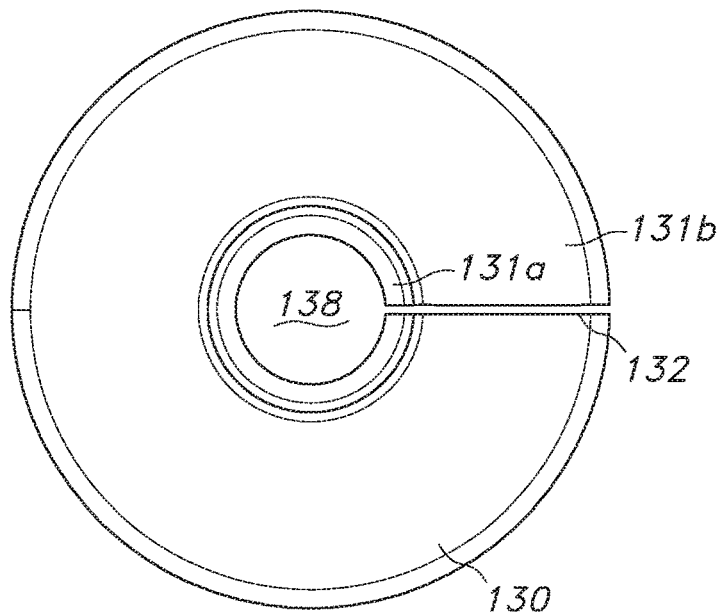
FIG. 6 illustrates a bottom view of the sleeve member shown in FIG. 3.

A shown in FIG. 4, in some implementations, the sleeve member 130 may further comprise an interior opening 138 that extends through the longitudinal axis thereof. In some implementations, the diameter of the opening 138 may be large enough to allow the sleeve member 130 to slide freely up and down a length of the pole 102 (see, e.g., FIG. 2).

As shown in FIGS. 3 and 4, in some implementations, the sleeve member 130 may include a longitudinally extending vertical slit 132 therein. In some implementations, the vertical slit 132 may extend from the interior opening 138 through an exterior side of the sleeve member 130 (see, e.g., FIGS. 3 and 4). In some implementations, the sleeve member 130 may be flexible (i.e., fabricated from a flexible material) thereby allowing the vertical slit 132 to be parted and the sleeve member 130 fitted about a pole 102. In this way, a pole 102 mounted bird feeder 105 does not need to be disassembled and/or removed from the ground in order to position the sleeve member 130 thereon.

As shown in FIG. 4, in some implementations, the sleeve member 130 may further comprise a cavity 136 and a conduit 134 for the line 126 of the self-retracting reel 120. In some implementations, the conduit 134 may extend from the cavity 136, through the exterior of the head portion 131b of the sleeve member 130.

As shown in FIG. 4, in some implementations, the cavity 136 may be located within the head portion 131b of the sleeve member 130. In some implementations, the self-retracting reel 120 may be positioned and/or secured within the cavity 136 in the sleeve member 130. In some implementations, the self-retracting reel 130 may be positioned and/or secured within the cavity 136 during the fabrication (e.g., injection molding) of the sleeve member 130. It should be understood that the sleeve member 130 may be fabricated using any suitable technology known to one of ordinary skill in the art.

As shown in FIG. 4, in some implementations, the line 126 of the self-retracting reel 120 may extend from the cavity 136, through the conduit 134, with the distal end thereof secured to the adapter 122 (e.g., a ring). In some implementations, the adapter 122 may include a collar 140 thereon. In this way, the adapter 122 may prevent the line 126 from being drawn into the cavity 136 of the sleeve member 130 by the self-retracting reel 120.

In some implementations, the sleeve member 130 may be the same color as the pole 102 it is to be used with. In some implementations, the sleeve member 130 may not be the same color as the pole 102 it is to be used with.

In some implementations, the sleeve member 130 may be constructed of a foam material. In some implementations, the sleeve member 130 may be constructed of a plastic material. In some implementations, the sleeve member 130 may be constructed of any suitable material.

As shown in FIG. 1, in some implementations, the self-retracting reel 120 may be used to lift the sleeve member 120 to its equilibrium position on the pole 102 and/or hold the sleeve member 120 at its equilibrium position on the pole 102. In some implementations, the adapter 122 may be configured to secure the sleeve member 130 to the fastener 110 mounted on the pole 102.

As shown in FIG. 2, in some implementations, the line 126 of the self-retracting reel 120 may be short enough to arrest the fall of the sleeve member 130 before it hits the ground adjacent the pole 102 onto which the squirrel deterrent kit 100 has been installed. In some implementations, the retractable line 126 may be a length of cord, wire, and/or any other material suitable for use as the line 126 of a self-retracting reel 120 being used as part of a squirrel deterrent kit 100.

In some implementations, the fastener 110 (e.g., a hook) may be mounted on the pole 102 using a clamp 112. In some implementations, any clamp suitable for securing the fastener 110 to the pole 102 may be used (e.g., a cable tie). Through the use of a clamp 112 or other suitable fastener, the squirrel deterrent kit 100 may be used with virtually any pole mounted bird feeder.

In operation, a squirrel will climb the pole 102 of a bird feeder 105 in an attempt to steal the food therefrom. When the squirrel reaches the sleeve member 130, the weight of the squirrel will overcome the bias of the self-retracting reel 120 causing the sleeve member 130 to slide downward (see, e.g., FIG. 2). The downward movement of the sleeve member 130 and/or its sudden stop will dislodge the squirrel therefrom. Once the squirrel has been dislodged, the self-retracting reel 120 will return the sleeve member 130 to its equilibrium position (or resting position) at or near the top of the pole 102 (see, e.g., FIG. 1). In this way, the squirrel remains unharmed and has been prevented from stealing the food from the bird feeder 105. If the squirrel repeats its attempt to climb the pole 102, the above processes will be repeated until the squirrel becomes discouraged and leaves.

In addition to preventing squirrels from climbing the pole 102 of a bird feeder 105, the present invention may provide entertainment for persons watching the squirrel attempt to climb the pole 102 to steal food from the bird feeder 105.

Reference throughout this specification to "an embodiment" or "implementation" or words of similar import means that a particular described feature, structure, or characteristic is included in at least one embodiment of the present invention. Thus, the phrase "in some implementations" or a phrase of similar import in various places throughout this specification does not necessarily refer to the same embodiment.

Many modifications and other embodiments of the inventions set forth herein will come to mind to one skilled in the art to which these inventions pertain having the benefit of the teachings presented in the foregoing descriptions and the associated drawings.

The described features, structures, or characteristics may be combined in any suitable manner in one or more embodiments. In the above description, numerous specific details are provided for a thorough understanding of embodiments of the invention. One skilled in the relevant art will recognize, however, that embodiments of the invention can be practiced without one or more of the specific details, or with other methods, components, materials, etc. In other instances, well-known structures, materials, or operations may not be shown or described in detail.

While operations are depicted in the drawings in a particular order, this should not be understood as requiring that such operations be performed in the particular order shown, or in sequential order, or that all illustrated operations be performed, to achieve desirable results.

The invention claimed is:

1. A squirrel deterrent kit for use with a pole mounted bird feeder, the squirrel deterrent kit comprising:
   a sleeve member configured to be slidably fitted about a pole;
   a self-retracting reel positioned within a cavity in the sleeve member, the self-retracting reel includes a line having an adapter secured on a distal end thereof; and a fastener configured to be mounted on the pole above the sleeve member, the fastener is configured to attach to the adapter secured on the distal end of the line;

wherein the self-retracting reel is configured to hold the sleeve member at an equilibrium position on the pole until the weight of an animal climbing thereon overcomes the bias of the self-retracting reel causing the sleeve member to slide downward;

wherein the self-retracting reel is configured to lift the sleeve member to the equilibrium position on the pole when the animal has been dislodged therefrom.

2. The squirrel deterrent kit of claim 1, wherein the sleeve member comprises an elongated cylindrical stem having a dome shaped head portion, the cavity containing the self-retracting reel is located within the head portion of the sleeve member.

3. The squirrel deterrent kit of claim 2, wherein the sleeve member further comprises an interior opening that extends through the longitudinal axis thereof, the diameter of the interior opening is larger than the diameter of the pole.

4. The squirrel deterrent kit of claim 3, wherein the sleeve member further comprises a longitudinally extending vertical slit therein, the vertical slit extends from the interior opening through an exterior side of the sleeve member.

5. The squirrel deterrent kit of claim 4, wherein the sleeve member is fabricated from a flexible material thereby allowing the vertical slit to be parted and the sleeve member fitted about a pole.

6. The squirrel deterrent kit of claim 2, wherein the head portion of the sleeve member includes a conduit therein, the conduit is configured so that the line of the self-retracting reel may extend from the cavity, through the conduit, with the adapter secured to the distal end of the line being positioned for attachment to the fastener.

7. The squirrel deterrent kit of claim 1, wherein the sleeve member further comprises an interior opening that extends through the longitudinal axis thereof, the diameter of the interior opening is larger than the diameter of the pole.

8. The squirrel deterrent kit of claim 7, wherein the sleeve member further comprises a longitudinally extending vertical slit therein, the vertical slit extends from the interior opening through an exterior side of the sleeve member.

9. The squirrel deterrent kit of claim 8, wherein the sleeve member is fabricated from a flexible material thereby allowing the vertical slit to be parted and the sleeve member fitted about a pole.

10. The squirrel deterrent kit of claim 2, wherein the head portion of the sleeve member is larger in diameter than the cylindrical stem thereof.

\* \* \* \* \*